United States Patent
Zhou

(10) Patent No.: US 9,733,421 B2
(45) Date of Patent: Aug. 15, 2017

(54) DISPLAY DEVICE AND BACKLIGHT MODULE THEREOF

(71) Applicant: Wuhan China Star Optoelectronics Technology Co., Ltd., Wuhan, Hubei (CN)

(72) Inventor: Gege Zhou, Hubei (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 145 days.

(21) Appl. No.: 14/443,613

(22) PCT Filed: Apr. 13, 2015

(86) PCT No.: PCT/CN2015/076441
§ 371 (c)(1),
(2) Date: May 18, 2015

(87) PCT Pub. No.: WO2016/161663
PCT Pub. Date: Oct. 13, 2016

(65) Prior Publication Data
US 2017/0045676 A1 Feb. 16, 2017

(30) Foreign Application Priority Data

Apr. 9, 2015 (CN) .......................... 2015 1 0165589

(51) Int. Cl.
*F21V 7/22* (2006.01)
*F21V 8/00* (2006.01)
*G02F 1/1335* (2006.01)

(52) U.S. Cl.
CPC ......... *G02B 6/0088* (2013.01); *G02B 6/0051* (2013.01); *G02B 6/0053* (2013.01);
(Continued)

(58) Field of Classification Search
CPC .. G02B 6/0088; G02B 6/0055; G02B 6/0053; G02B 6/0051; G02B 6/0065
(Continued)

(56) References Cited

U.S. PATENT DOCUMENTS 9,239,419 B2   1/2016 Yan
2008/0002099 A1  1/2008 Oh
(Continued)

FOREIGN PATENT DOCUMENTS

CN    201284963    8/2009
CN    101598860    12/2009
(Continued)

OTHER PUBLICATIONS

International Search Report for PCT/CN2015/076441, English translation attached to original, Both completed by the Chinese Patent Office on Dec. 12, 2015, All together 8 Pages.
(Continued)

*Primary Examiner* — Andrew Coughlin
*Assistant Examiner* — Keith Delahoussaye
(74) *Attorney, Agent, or Firm* — Brooks Kushman P.C.

(57) ABSTRACT

A backlight module having a light guide plate, an optical assembly disposed on an upper surface of the light guide plate, and a light shielding tape, the light guide plate includes a light guide plate body and a reinforcement member disposed at a non-incidence side end surface of the light guide plate body, and the light shielding tape is adhered to a portion of an upper surface of the optical assembly and extends to cover the reinforcement member. Further provided is a display device having the same.

10 Claims, 1 Drawing Sheet

(52) U.S. Cl.
CPC ......... *G02B 6/0055* (2013.01); *G02B 6/0065* (2013.01); *G02F 1/1335* (2013.01)

(58) Field of Classification Search
USPC ........................................................ 362/607
See application file for complete search history.

(56) References Cited

U.S. PATENT DOCUMENTS

| | | | |
|---|---|---|---|
| 2011/0069255 A1* | 3/2011 | Choi | G02B 6/0088 349/63 |
| 2012/0257409 A1* | 10/2012 | Huang | G02B 6/0035 362/603 |
| 2016/0327733 A1 | 11/2016 | Liu et al. | |

FOREIGN PATENT DOCUMENTS

| | | |
|---|---|---|
| CN | 102566091 | 7/2012 |
| CN | 103032780 | 4/2013 |
| CN | 103162182 | 6/2013 |
| CN | 203375279 | 1/2014 |
| CN | 203413471 | 1/2014 |
| CN | 203745771 | 7/2014 |
| CN | 104360541 | 2/2015 |
| CN | 104373871 | 2/2015 |
| CN | 104791660 | 7/2015 |
| EP | 1975653 | 10/2008 |
| KR | 20140065256 | 5/2014 |

OTHER PUBLICATIONS

Second Chinese Office Action for Chinese Application No. CN 201510165589.5, English translation attached to original, Both completed by the Chinese Patent Office, Dated Apr. 25, 2017, All together 17 pages.

* cited by examiner

DISPLAY DEVICE AND BACKLIGHT MODULE THEREOF

CROSS-REFERENCE TO RELATED APPLICATION

This application is the U.S. national phase of PCT Application No. PCT/CN2015/076441 filed on Apr. 13, 2015, which claims priority to CN Patent Application No. 201510165589.5 filed on Apr. 9, 2015, the disclosures of which are incorporated in their entirety by reference herein.

BACKGROUND OF THE INVENTION

1. Field of the Invention

The present disclosure relates to a field of display technology, and in particular, relates to a display device and a backlight module thereof.

2. The Related Arts

With the rapid development of LCD (Liquid Crystal Display) panel industry, the LCD Display gradually becomes the trend of display technology due to its many advantages such as ultra-thin, light weight, radiationless, stable performance or the like. Most of the liquid crystal displays in market are backlight type liquid crystal display device having a liquid crystal display panel and a backlight module, wherein the display panel is mounted and protected by a frame of the backlight module.

With the development and popularity of the liquid crystal display technology, a liquid crystal display panel with narrow bezel has become a main trend in the market. In order to reduce overall width of the display panel, the backlight module generally comprises a light guide plate, a frame surrounding the light guide plate, a flexible circuit board, an optical film and a light shielding tape. The flexible circuit board is fixed on the light guide plate and the frame by the light shielding tape, and meanwhile, the optical film is fixed on the frame by the light shielding tape. The thickness of such common backlight module would be inevitably increased due to a certain thickness of the frame. Furthermore, since there is an error in a process of assembling the light guide plate and the frame, an assembling gap between the light guide plate and the frame is inevitably generated, further increasing the overall thickness of the liquid crystal display device. Meanwhile, traditional backlight module needs more elements, the structure thereof is complicated, the manufacturing cost and assembling processes are increased, and the assembling efficiency is low, which is not conducive to mass production.

SUMMARY

In view of the disadvantages of traditional technology, a display device that has a high assembling efficiency, simple structure, and a small overall width, and a backlight module thereof are provided.

According to an embodiment of the disclosure, there is provided a backlight module comprising a light guide plate, an optical assembly disposed on an upper surface of the light guide plate, and a light shielding tape, wherein the light guide plate comprises a light guide plate body and a reinforcement member disposed at a non-incidence side end surface of the light guide plate body, and the light shielding tape is adhered to a portion of an upper surface of the optical assembly and extends to cover the reinforcement member.

A reflecting sheet is further disposed on a lower surface of the light guide plate.

The light shielding tape extends to adhere on a portion of a lower surface of the light guide plate.

The lower surface of the light guide plate is coated with a light reflecting material layer.

The width of the optical assembly is the same as that of the light guide plate.

The reinforcement member is a metallic frame structure.

The reinforcement member comprises two bent portions which are attached tightly to an upper surface and a lower surface of the light guide plate body, respectively, and the two bent portions flush with the upper surface and the lower surface of the light guide plate body, respectively.

The reinforcement member and the light guide plate body are formed integrally by injection molding.

According to another embodiment of the disclosure, there is provided a display device comprising a display panel and the above-described backlight module, and the display panel is disposed at an upper surface of the backlight module.

Compared with the prior art, the backlight module and the display device according to the present disclosure have removed the back plate and the frame structure, and a reinforcement member is disposed at the non-incidence side of the light guide plate, thereby ensuring structural strength of the product while simplifying the structure of the product, saving design cost, improving assembling efficiency of the product, and further reducing width of the product.

DETAILED DESCRIPTION OF EXEMPLARY EMBODIMENTS

The present disclosure will be further described in detail hereinafter with reference to the accompanying drawings and embodiments, such that the purposes, technical solutions and advantages of present disclosure are more clearly understood. It should be understood that the described certain embodiments are merely used to explain the present disclosure, and not intended to be limiting of the disclosure.

Figure 1:
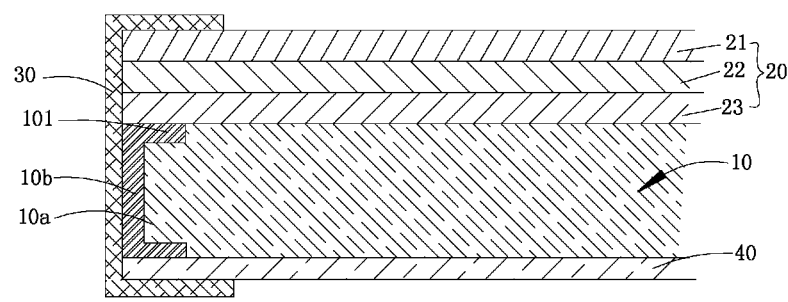
FIG. 1 is a schematic sectional view of the backlight module according to an embodiment of the present disclosure.

Referring to FIG. 1, a backlight module according to the present disclosure comprises a light guide plate 10, an optical assembly 20 disposed on an upper surface of the light guide plate 10, and a light shielding tape 30, wherein the light guide plate 10 comprises a light guide plate body 10a and a reinforcement member 10b disposed at a non-incidence side end surface of the light guide plate body 10a, and the light shielding tape 30 is adhered to a portion of an upper surface of the optical assembly 20 and extends to cover the reinforcement member 10b.

The reinforcement member 10b according to the present embodiment is a frame structure, and is made of metallic materials. Specifically, two ends of the reinforcement member 10b are bent at 90° toward the same direction to form bent portions 101, and the reinforcement member 10b wraps the non-incidence side end surface of the light guide plate body 10a, and meanwhile, two bent portions 101 wrap an upper surface and a lower surface the light guide plate body 10a, respectively, and flush with the upper surface and the lower surface of the light guide plate body 10a, respectively, such that corresponding non-incidence sides of the light guide plate 10 are well protected. The reinforcement member 10b and the light guide plate body 10a are formed integrally by injection molding. Due to the presence of the reinforcement member 10b, strength of ends of the light guide plate 10 is enhanced, and the light guide plate 10 is well protected. Meanwhile, the reinforcement member 10b functions to reflect light emitted to the non-incidence side back to the inside of the light guide plate body 10a, thereby decreasing light pollution, while further improving utilization of the light.

A reflecting sheet 40 is further disposed on a lower surface of the light guide plate 10, preventing the light from emitting from the lower surface of the light guide plate body 10a, reflecting the light irradiated on an upper surface of the reflecting sheet 40, improving the light uniformity of the backlight module and the utilization of the light. The reflecting sheet 40 may be made of a mirror-like silver or polished and oxidized mirror-like aluminum material having high reflectivity. In other embodiments, it should be understood that the reflecting sheet 40 may be substituted with a light reflecting material layer coated on the lower surface of light guide plate 10, such that the number of the elements is reduced, and meanwhile the same technical effect can be achieved.

Specifically, the optical assembly 20 has a tri-layer composite structure of an upper brightness enhancement sheet 21, a lower brightness enhancement sheet 22, and diffusion sheet 23, which are stacked sequentially on the upper surface of the light guide plate 10 from up to down. For the convenience of assembling, the width of the optical assembly 20 is substantially the same as that of the light guide plate 10.

A light source (not shown) of the backlight module is disposed at a light incidence side of the light guide plate 10, specifically, a light bar is formed by uniformly mounting a plurality of LED (Light-Emitting Diode) light sources on a LED substrate, and meanwhile a groove (not shown) for embedding the light bar is formed at an end surface of the light guide plate body 10a of the light guide plate 10 near the light incidence side, thus the light bar is mounted on the light guide plate 10.

The light shielding tape 30 according to the embodiment is a double-sided tape, of which one end is adhered to a partial area of the upper surface of the optical assembly 20, the other end is adhered to a portion of a lower surface of reflecting sheet 40, and a middle portion is adhered to sides of the optical assembly 20, the light guide plate 10, and the reflecting sheet 40.

Figure 2:
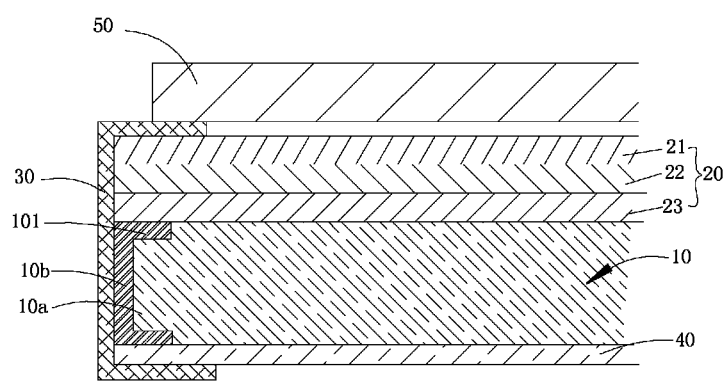
FIG. 2 is a schematic sectional view of the display device according to an embodiment of the present disclosure.

As shown in FIG. 2, the present disclosure further provides a display device including a display panel 50 and the backlight module, wherein the display panel 50 is disposed on an upper surface of the backlight module. A periphery of the display panel 50 is fixed to the backlight module by the light shielding tape 30. Specifically, the display panel 50 is adhered to an upper surface of the upper brightness enhancement sheet 21.

The backlight module and the display device according to an embodiment of the present disclosure do not have a back plate and a frame structure, a reinforcement member 10b is disposed at the non-incidence side of the light guide plate, and the optical assembly 20 and the light guide plate 10 are adhered together by using a light shielding tape, thereby ensuring structural strength of the product, saving design cost, improving assembling efficiency of the product, and further reducing width of the product.

The foregoing are only specific embodiments of present disclosure, and it should be noted that various modifications and amendments may be made by those ordinary skilled in the art without departing from the principle of the present disclosure, and these modifications and amendments should be regarded as being within the scope of the present disclosure.

What is claimed is:

1. A backlight module, comprising:
   a light guide plate,
   a reflecting sheet disposed along the plate lower surface of the light guide plate,
   an optical assembly disposed on a plate upper surface of the light guide plate,
   a light shielding tape, wherein the light guide plate comprises a light guide plate body and a reinforcement member integrally formed with and disposed about a non-light incidence side of the light guide plate body, and the light shielding tape is adhered to a portion of an assembly upper surface of the optical assembly and a lower surface of the reflection sheet and extends therebetween along the non-light incidence side to cover the reinforcement member, and
   wherein the reinforcement member comprises a first bent portion in contact with a body upper surface of the light guide plate body and a second bent portion in contact with a body lower surface of the light guide plate body, and each of the bent portions is flush with the corresponding surface of the light guide plate body.

2. The backlight module of claim 1, wherein the plate lower surface of the light guide plate is coated with a light reflecting material layer.

3. The backlight module of claim 1, wherein a first width of the optical assembly is equal to a second width of the light guide plate.

4. The backlight module of claim 1, wherein the reinforcement member is a metallic frame structure.

5. The backlight module of claim 1, wherein the reinforcement member reflects light emitted from a light incidence side disposed opposite the non-light incidence side and directs the light to the light guide plate body.

6. A display device comprising:
   a display panel disposed on a module upper surface of a backlight module,
      wherein the backlight module comprises a light guide plate, an optical assembly disposed on a plate upper surface of the light guide plate, and a light shielding tape, and
      wherein the light guide plate comprises a light guide plate body and a reinforcement member integrally formed with and disposed about a peripheral portion of a non-light incidence side of the light guide plate body, the light shielding tape is adhered to an assembly upper surface of the optical assembly and a sheet lower surface of a reflection sheet disposed along a plate lower surface of the light guide plate and extends therebetween along the non-light incidence side to cover the reinforcement member, and
      wherein the reinforcement member comprises a first bent portion in contact with a body upper surface of the light guide plate body and a second bent portion in contact with a body lower surface of the light guide plate body, and each of the bent portions is flush with the corresponding surface of the light guide plate body.

7. The display device of claim 6, wherein the plate lower surface of the light guide plate is coated with a light reflecting material layer.

8. The display device of claim 6, wherein corresponding widths of the optical assembly and the light guide plate are equal.

9. The display device of claim 6, wherein the reinforcement member is a metallic frame structure.

10. The display device of claim 6, wherein the reinforcement member is configured to reflect light emitted from a light incidence side disposed opposite the non-light incidence side and directs the light to the light guide plate body.

* * * * *